March 2, 1965 W. M. DAVIS, JR 3,172,029

LINEAR POWER OUTPUT DEVICE

Filed April 7, 1961 3 Sheets-Sheet 1

INVENTOR.
WILLIAM M. DAVIS JR.
BY Roger W. Jensen
ATTORNEY

INVENTOR.
WILLIAM M. DAVIS JR.
BY Roger W. Jensen
ATTORNEY

March 2, 1965 W. M. DAVIS, JR 3,172,029

LINEAR POWER OUTPUT DEVICE

Filed April 7, 1961 3 Sheets-Sheet 3

INVENTOR.
WILLIAM M. DAVIS JR.
BY Roger W. Jensen
ATTORNEY

United States Patent Office 3,172,029

Patented Mar. 2, 1965

3,172,029

LINEAR POWER OUTPUT DEVICE

William M. Davis, Jr., Clearwater, Fla., assignor to Honeywell Inc., a corporation of Delaware Filed Apr. 7, 1961, Ser. No. 101,476

9 Claims. (Cl. 321—47)

The present invention relates generally to thyratron-type amplifiers and more specifically to an amplifier using silicon controlled rectifiers. This invention provides in an amplifier a means for obtaining a voltage or current output which changes linearly with respect to the input voltage even though sine wave power (which the controlled rectifiers switch on and off), is used to supply the power to the load.

In prior art amplifiers, controlled rectifiers have been used with a sine wave source of power to switch the power to the load to an "on" condition at various points in the time period of the sine wave. It was found, however, that the output was a nonlinear function of the input control voltage due to the fact that more power is contained in an area determined by a given fraction of a period around the 90 degree point of a sine wave than the same fraction of a period in the first few degrees of the sine wave.

This amplifier overcomes the difficulty found in the prior art by differentiating a full wave rectified sine wave to produce a nonlinear function which is matched against a D.C. control voltage to define the point in time when the controlled rectifier will switch and apply power to the load. The nonlinear waveform is of such shape that equal increments of D.C. voltage matched against the equal voltage points in this wave will result in different time increments long the path of the waveform. These nonlinear time increments when matched against a corresponding half cycle of a sine wave will produce equal increments of power and thus result in a linear function of power output from the amplifier.

One of the objects of this invention is to produce an amplifier which gives an output power which is a linear function of the input voltage.

Another object of this invention is to provide a means for producing a solid state, compact, and reliable amplifier.

Other objects of this invention will become apparent from a reading of the following specification and appended claims, and in conjunction with the accompanying drawings of which:

Figures 3A, 3B:
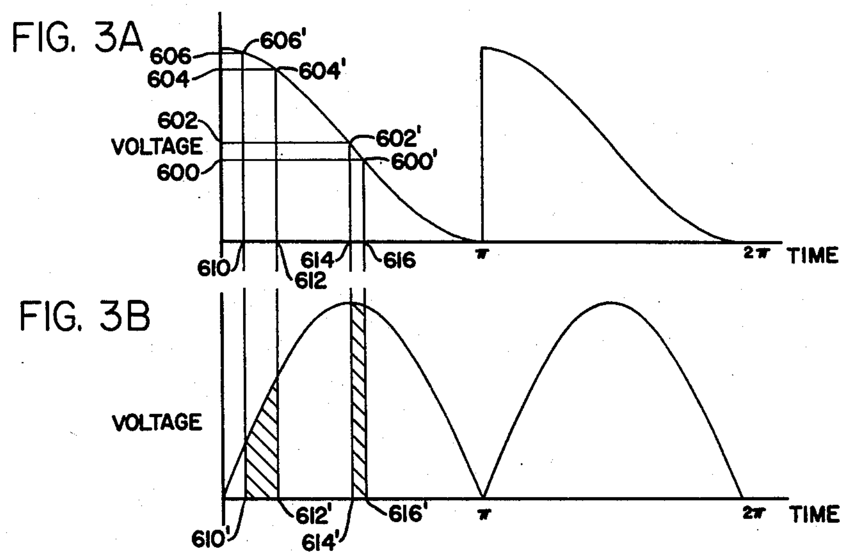
Figures 4A, 4B:
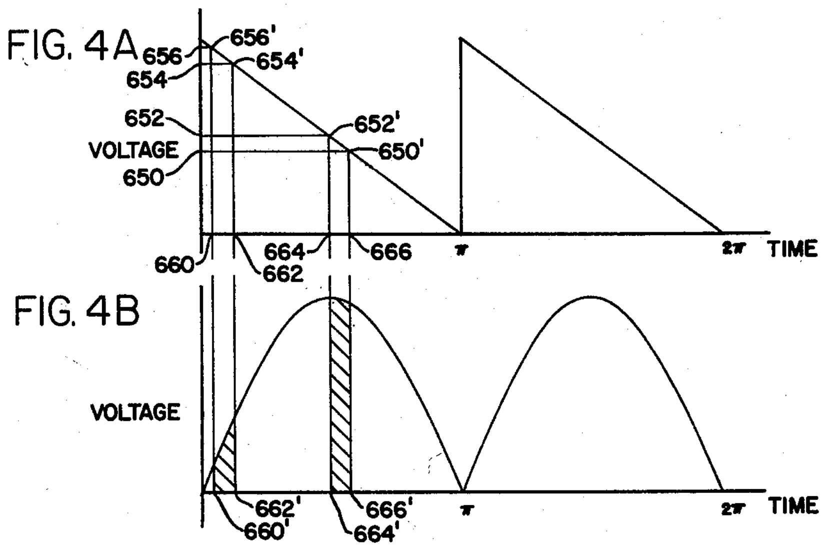

FIGURE 3*a* is a curve representative of the waveform obtained when a full wave rectified, unfiltered sine wave is differentiated;

FIGURE 3*b* is a waveform indicative of a full wave rectified, unfiltered sine wave;

FIGURE 4*a* is a waveform generally known as a saw tooth;

FIGURE 4*b* is another full wave rectified, unfiltered sine waveform.

Figure 1:
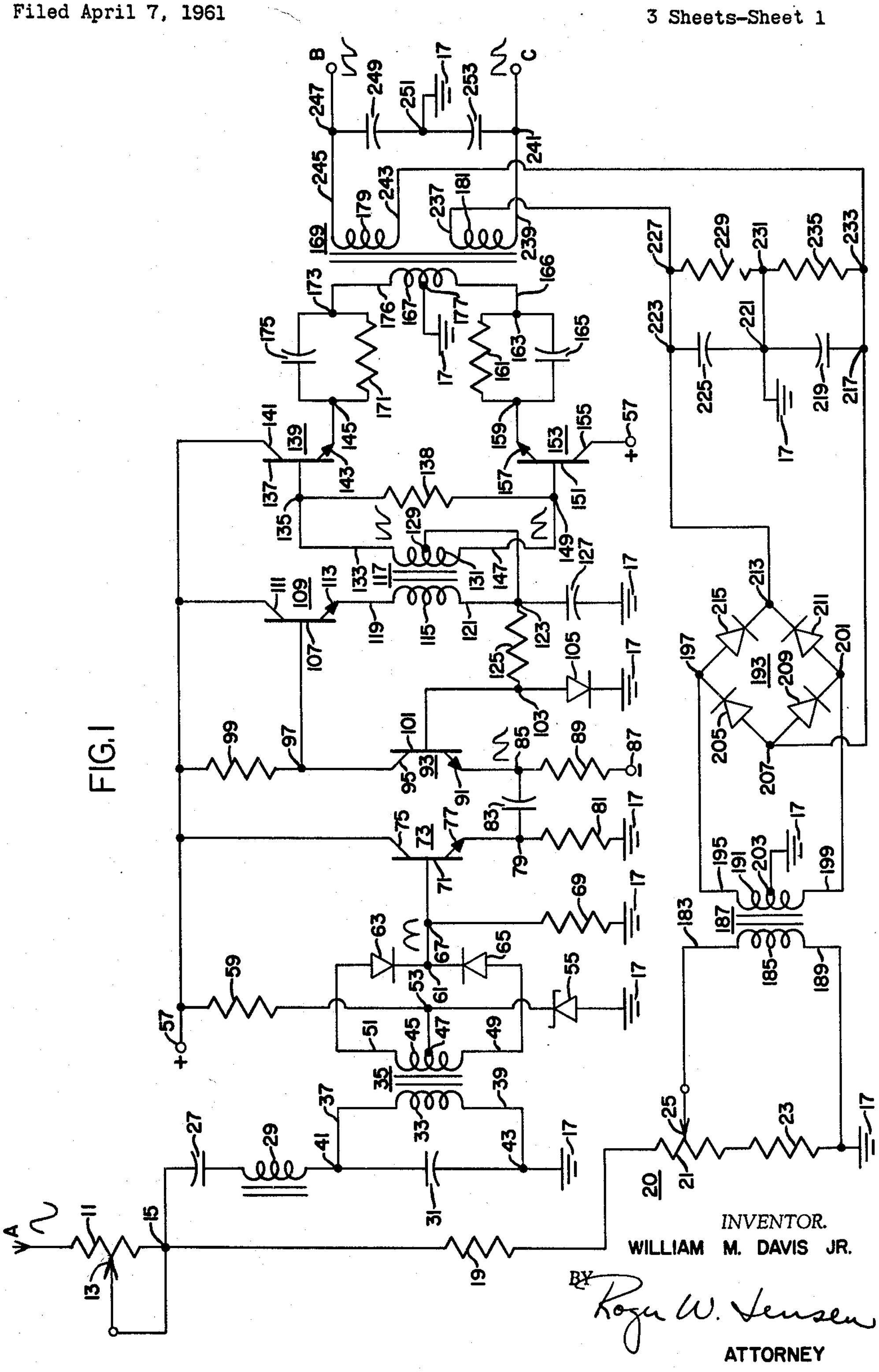
FIGURE 1 is a circuit diagram of a nonlinear function generator.

FIGURE 1 shows input power applied at a terminal A. This power is of a frequency desirable to use on the load. In one embodiment of the invention, 400 cycle power was used, however, other frequencies could be used. Terminal A is connected to one end of a variable resistance element 11 which has a wiper element 13. Both the wiper element or rheostat 13 and the other end of resistor element 11 are connected to a junction point 15. The junction point 15 is connected to a ground point 17 through three series connected resistors 19, 21, and 23. The resistance element 21 is part of a potentiometer 20 having a wiper arm 25. The junction point 15 is also connected to ground 17 through a series combination of a capacitor 27, an inductor 29, and a parallel combination of a capacitor 31 and a primary winding 33 of a transformer 35. A lead 37 on one end of winding 33 and another lead 39 on the other end of the primary winding 33 are connected to a junction point 41 and another junction 43 on either side of the capacitor 31. A secondary winding 45 of the transformer 35 is provided with a center tap 47 and output leads 49 and 51. The center tap 47 is connected to ground 17 through a junction point 53 and a Zener diode 55. The diode 55 has its anode connected to ground in this embodiment of the invention. The junction point 53 is also connected to a positive direct current power supply terminal 57 through a resistance element 59. The lead 51 of the secondary winding 45 is connected to a junction point 61 through a diode element 63. The lead 49 of the secondary winding 45 is also connected to the junction point 61 through a diode 65. Both diodes are connected, in this embodiment, to permit current flow from the secondary winding 45 to the junction point 61. The junction point 61 is connected to ground 17 through another junction point 67 and a resistance element 69. The junction point 67 is connected to a base 71 of a NPN transistor 73. The transistor 73 has a collector 75 which is connected to the positive power supply terminal 57 and an emitter 77 which is connected to ground 17 through a series combination of a junction point 79 and a resistance element 81. A capacitor 83 is connected between the junction point 79 and a junction point 85. The junction point is connected to a negative power supply 87 through a resistor 89. The junction point 85 is also connected to an emitter 91 of a NPN transistor 93. A collector 95 of the transistor 93 is connected to the positive power terminal 57 through a junction point 97 and a resistance element 99. A base 101 of the transistor 93 is connected to ground 17 through a junction point 103 and a diode 105. The diode 105 is connected to provide current flow from junction point 103 to ground 17. The junction point 97 is connected to a base 107 of a NPN transistor 109. A collector 111 of the transistor 109 is connected to the positive power terminal 57. An emitter 113 of the transistor 109 is connected to one end of a primary winding 115 of a transformer 117 by a lead 119. Another lead 121 on the other end of the primary 115 is connected to a junction point 123. A resistance element 125 is connected between the junction points 103 and 123. A capacitor 127 is connected between the junction point 123 and ground 17. The junction point 123 is also connected to a center tap 129 of a secondary winding 131 of the transformer 117. A lead 133 on one end of the secondary winding 131 is connected to a junction point 135 and to a base 137 of a NPN transistor 139. Junction point 135 is connected to one end of a resistor 138. A collector 141 of the transistor 139 is connected to the positive power terminal 57. An emitter 143 of the transistor 139 is connected to a junction point 145. Another lead 147 on the other end of the secondary winding 131 is connected to a junction point 149 and to a base 151 of a NPN transistor 153. Junction point 149 is connected to the other end of resistor 138. A collector 155 of transistor 153 is connected to the positive power supply 57. An emitter 157 of the transistor 153 is connected to a junction point 159. A resistance element 161 is connected between the junction point 159 and a junction point 163. A capacitor 165 is also connected between the junction points 159 and 163. The junction point 163 is connected to a lead 166 on one end of a primary winding 167 of a transformer 169. A resistance element 171 is connected to the junction point 145 on one end and to a junction point 173 on the other end. A capacitor 175 is also connected between the junction points 145 and 173. The junction point 173 is connected to a lead 176 on the other end of the primary winding 167. A center tap 177 of the primary winding 167 is connected to ground 17. The transformer 169 has a first secondary winding 179 and a second secondary winding 181. The wiper 25 of the resistance element 21 is connected to a lead 183 on one end of a primary winding 185 on a transformer 187. Another lead 189 on the other end of the primary winding 185 is connected to ground 17. A center tapped secondary winding 191 of the transformer 187 is connected to a diode bridge 193. A lead 195 on one end of the secondary winding 191 is connected to a junction point 197 of the diode bridge 193. Another lead 199 on the other end of the secondary winding 191 is connected to another junction point 201 of the diode bridge 193. A center tap 203 of the secondary winding 191 is connected to ground 17. A diode 205 of the diode brige 193 is connected between junction point 197 and a junction point 207. A diode 209 is connected between the junction points 207 and 201. A diode 211 is connected between the junction point 201 and a junction point 213. A diode 215 is connected between the junction points 197 and 213. The diodes 205, 209, 211, and 215 of the bridge 193 are connected to give a current flow from the junction point 207 to the junction point 213. The junction point 207 is connected to ground 17 through a series combination of a junction point 217, a capacitor 219, and a junction point 221. The junction point 213 is also connected to ground 17 through a junction point 223, a capacitor 225 and the junction point 221. The junction point 223 is also connected to ground through a path constituting a junction point 227, a resistor 229, a junction point 231 and the junction point 221. A second path to ground 17 from the junction point 217 is through a junction point 233, a resistor 235, junction point 231 and the junction point 221. The junction point 227 is connected to a lead 237 on one end of the secondary winding 181 of transformer 169. Another lead 239 on the other end of the secondary winding 181 is connected to a junction point 241 and an output terminal C. The junction point 233 is connected to a lead 243 on one end of the secondary winding 179 of transformer 169. Another lead 245 on the other end of the winding 179 is connected to a junction point 247 and an output terminal B. A capacitor 249 is connected between the junction point 247 and a junction point 251. A capacitor 253 is connected between the junction points 251 and 241. The junction point 251 is also connected to ground 17.

Figure 2:
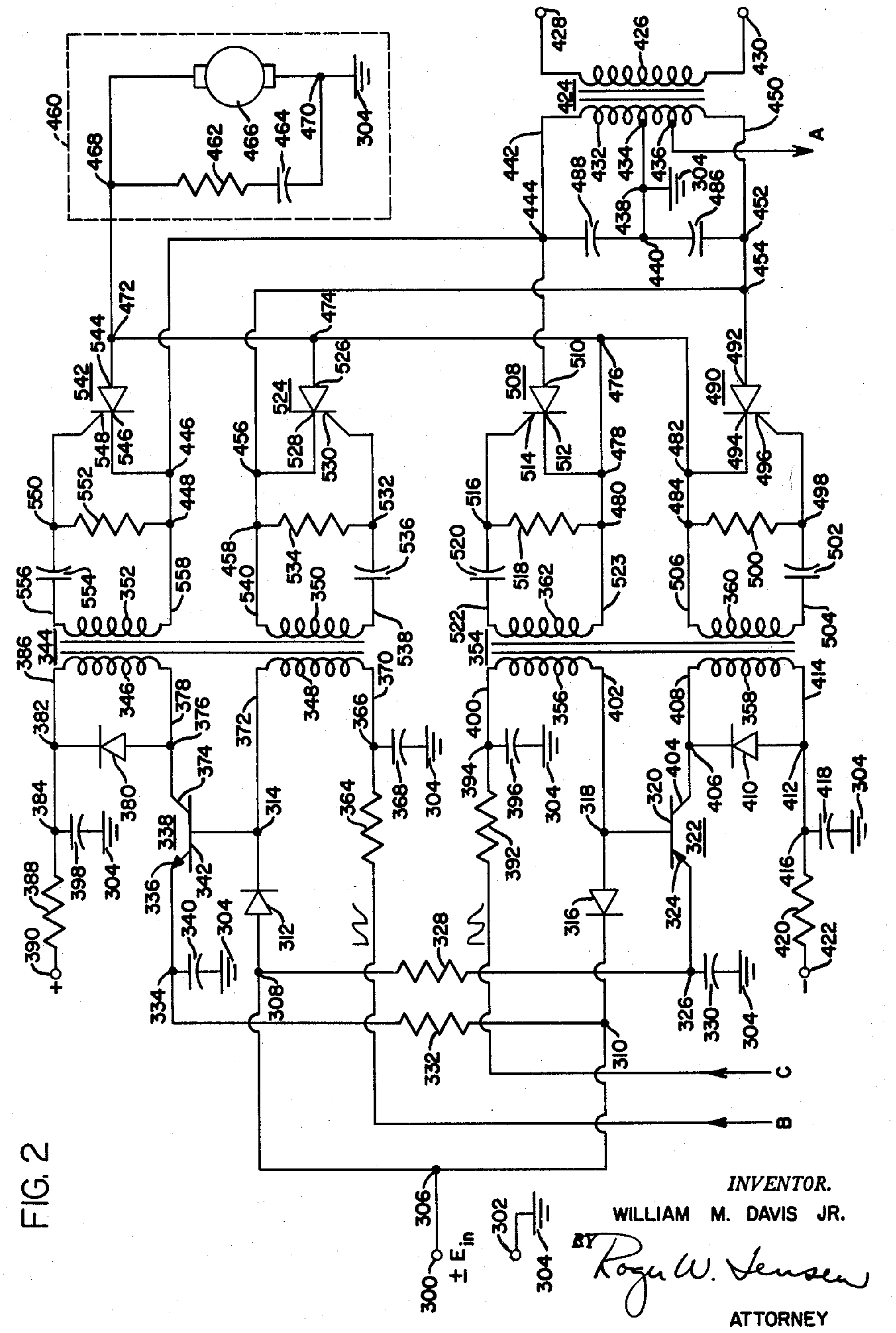
FIGURE 2 is a circuit diagram disclosing the switching circuit and controlled rectifier circuit in the power amplifier.

In FIGURE 2 the terminals A, B, and C correspond to and are connected to the respective terminals A, B and C in FIGURE 1. Terminals 300 and 302 are input terminals to the power amplifier. The input terminal 302 is connected to a ground terminal or junction point 304 which corresponds to the ground terminal 17 in FIGURE 1. The input terminal 300 is connected to junction points 306, 308, and 310. A diode 312 is connected between the junction point 308 and junction point 314 and is positioned to allow current flow from point 308 to junction point 314. A diode 316 is connected between the junction point 310 and a junction point 318 and is placed to allow current flow toward junction point 310. The junction point 318 is connected to a base 320 of a PNP transistor 322. An emitter 324 of the transistor 322 is connected to the junction point 308 through a junction point 326 and a resistance element 328. The junction point 326 is connected to ground terminal 304 through a capacitor 330. One end of a resistor 332 is connected to the junction point 310 and the other end is connected to a junction point 334 and to an emitter 336 of a NPN transistor 338. A capacitor 340 is connected between junction point 334 and ground terminal 304. The junction point 314 is connected to a base 342 of the transistor 338. A transformer 344 is shown with windings 346, 348, 350, and 352. The winding 346 comes the closest to what is normally considered a primary winding. A second transformer 354 is shown with windings 356, 358, 360, and 362. In this case, winding 358 is what is normally considered a primary winding. A resistor 364 is connected between the input terminal B and a junction point 366. A capacitor 368 is connected between the junction point 366 and ground 304. The junction point 366 is also connected to a lead 370 on one end of the winding 348. Another lead 372 on the other end of the winding 348 is connected to the junction point 314. A collector 374 of the transistor 338 is connected to a junction point 376 and a lead 378 on one end of the winding 346. A diode 380 is connected between the junction point 376 and a junction point 382. The diode 380 allows current flow from point 376 to junction point 382. The junction point 382 is connected to another junction point 384 and also to a lead 386 on the other end of the winding 346. A resistor 388 is connected between the junction point 384 and a positive power terminal 390. A resistor 392 is connected between the terminal C and a junction point 394. A capacitor 396 is connected between the junction point 394 and ground terminal 304. A capacitor 398 is connected between the junction point 384 and the ground terminal 304. The junction point 394 is also connected to a lead 400 on one end of the winding 356. Another lead 402 on the other end of the winding 356 is connected to the junction point 318. A collector 404 of the transistor 322 is connected to a junction point 406 and also to a lead 408 on one end of the winding 358 on transformer 354. A diode 410 is connected between the junction point 406 and a junction point 412. The diode 410 allows current flow from junction point 412 toward junction point 406. Another lead 414 on the other end of the winding 358 is connected to the junction point 412 and also to a junction point 416. A capacitor 418 is connected between the junction point 416 and ground 304. A resistor 420 is connected between the junction point 416 and a negative power terminal 422. Alternating power to this amplifier is supplied to a transformer 424 at a primary winding 426 through input power terminals 428 and 430. The transformer 424 has a secondary winding 432 with a center tap 434 and a power tap 436. The center tap 434 is connected to a pair of junction points 438, 440, and ground 304. The power tap 436 is connected to the terminal A to supply a signal waveform to the function generator in FIGURE 1. A lead 442 on one end of the secondary winding 432 is connected to a trio of junction points 444, 446, and 448. Another lead 450 on the other end of the secondary winding 432 is connected to a set of junction points 452, 454, 456, and 458. A load which is generally designated as 460 is shown in this diagram as a combination of a resistor 462, a capacitor 464, and a motor 466. The resistor 462 and the capacitor 464 are connected in series and are connected across a pair of junction points 468 and 470 which are terminals of the motor 466. The junction point 470 is connected to ground 304. The junction point 468 which is the input terminal to the load 460 is connected to a set of junction points 472, 474, 476, 478, 480, 482, and 484. A capacitor 486 is connected between the junction points 440 and 452. A capacitor 488 is connected between the junction points 440 and 444. A first control rectifier 490 is shown with an anode 492 connected to the junction point 454 and a cathode 494 connected to the junction point 482 and a control lead 496 connected to a junction point 498. A resistor 500 is connected between the junction points 484 and 498. A capacitor 502 is shown connected between a lead 504 on one end of the winding 360 on transformer 354 and the junction point 498. Another lead 506 on the other end of the winding 360 is connected to the junction point 484. A second control rectifier 508 is shown with an anode 510 connected to the junction point 444, a cathode 512 connected to the junction point 478, and a control lead 514 connected to a junction 516. A resistor 518 is shown connected between the junction point 516 and the junction point 480. A capacitor 520 is connected between the junction point 516 and a lead 522 on one end of the winding 362 on the transformer 354. Another lead 523 on the other end of the winding 362 is connected to the junction point 480. A third control rectifier 524 is shown with an anode 526 connected to the junction point 474, a cathode 528 connected to the junction point 456, and a control terminal 530 connected to a junction point 532. A resistance element 534 is shown connected between the junction point 458 and the junction point 532. A capacitor 536 is shown connected between junction point 532 and a lead 538 on one end of the winding 350 on transformer 344. Another lead 540 on the other end of the winding 350 is connected to the junction point 458. A fourth control rectifier 542 is shown with an anode 544 connected to the junction point 472, a cathode 546 connected to the junction point 446 and a control lead 548 connected to a junction point 550. A resistance element 552 is connected between the junction point 550 and the junction point 448. A capacitor 554 is connected between the junction point 550 and a lead 556 on one end of the winding 352 on transformer 344. Another lead 558 on the other end of the winding 352 is connected to the junction point 448.

In FIGURE 3*a* a waveform is shown which is indicative of the waveform obtained when a sine wave which has been full wave rectified, is differentiated. In this specification and the appended claims, when a wave is said to be differentiated, it is meant that the first or input wave to a circuit is used to develop another wave having a shape that is proportional to the time derivative $$\frac{dE}{dt}$$

of the input wave. When an equation representing a sine wave from 0° to 180° is differentiated, a new equation is obtained which represents a cosine waveform from 0° to 18° or $\pi$. This new waveform which is obtained (as is shown in FIGURE 3*a*) is indicative of the time rate of change (time derivative) of a sine wave between 0° and 180°. This method of obtaining a new waveform is well known by those skilled in the art and is discussed on page 623 of Electronic and Radio Engineering by Fredrick Ferman, McGraw-Hill, 1955. FIGURE 3*a* is plotted on a coordinate system with voltage as a vertical axis and time in units of $\pi$ as a horizontal axis. The points 600, 602, 604, and 606 present voltage points on the vertical axis. The corresponding points in voltage on the waveform in FIGURE 3*a* are designated as 600′, 602′, 604′, and 606′. The points 600 and 602 are assumed to be the same potential difference as the points 604 and 606. The points 610, 612, 614, and 616 are points representative of different points in time along the horizontal axis, and correspond in time to the points 606′, 604′, 602′, and 600′, respectively on the nonlinear waveform. As will be noticed, matching the equidistant voltages on the vertical axis with the waveform shown on FIGURE 3*a* will give different variations in the time required to change from one voltage to the other as indicated by the difference in width of the distance between points 610 and 612 as compared to the distance between the points 614 and 616.

FIGURE 3*b* indicates a full wave rectified, unfiltered, sine waveform from which the figure in 3*a* may be obtained if the figure or the waveform shown in FIGURE 3*b* is differentiated. The waveform in FIGURE 3*b* is plotted on a pair of axes with voltage in the vertical direction and time in the horizontal direction. The time in FIGURE 3*b* is plotted on the same scale as that in FIGURE 3*a*. It will be noticed that points 610′, 612′, 614′, and 616′ correspond to points 610, 612, 614, and 616 in FIGURE 3*a*. The waveform in FIGURE 3*b* is also representative of a half cycle of the voltage waveform applied to a load from the time zero to the time $\pi$.

The main idea in this invention is obtaining a linear change in output voltage or current with a linear change in the input control voltage. It may be observed that equal changes in the voltage of the vertical axis in FIGURE 3*a* when matched against the waveform in that figure produced unequal time changes in the amount of time required for the waveform to get from one voltage to the other so that when these time changes are matched against the corresponding times in a sinusoidal waveform, two areas of unequal width are produced although the areas under the waveform are equal in area.

FIGURE 4*a* shows the prior art method of matching an input voltage against a waveform to produce different points in the firing time of a control rectifier or thyratron to produce changes in output current or voltage. In FIGURE 4*a* the points 650, 652, 654, and 656 are shown in the same voltage relationship to the zero axis as points 600, 602, 604, and 606 in FIGURE 3*a*. A set of points 650′, 652′, 654′, and 656′ are also indicative of the same voltage as that on the vertical axis when matched against similar points on the triangular or saw tooth waveform. Since the saw tooth waveform is linear, the variation in time for the waveform to change from one set of equidistant voltages to another set of equidistant voltages, are of the same magnitude in the time basis. It is thus seen that a pair of points 660 and 662, and a pair of points 664 and 666 are equal distances apart in time. When the points 660, 662, 664, and 666 are matched against the corresponding points 660′, 662′, 664′, and 666′ in the waveform shown in FIGURE 4*b*, it may be observed that, although the difference in time between the two sets of points are equal, the areas contained under the waveform between these two points in time are unequal. For this reason amplifiers in prior art, although using linear changes in input voltage, did not obtain linear changes in output voltage or current.

To summarize, if a control rectifier is fired at the point in time 616′ due to the level of the input control voltage being at 600, and then is changed an amount equal to the distance between points 600 and 602 so that the point in time at which the control rectifier now fires is 614′, the increase in power would be the same as would be obtained when the input control voltage would change from 604 to 606 which are the same differences in input control voltage as the two points 600 and 602. It is clear therefore that the present invention provides a linear relationship between input signals and output signals.

*Operation*

The circuit shown in FIGURE 1 is called a function generator and is used to provide the nonlinear waveform shown in FIGURE 3*a* which is required by the power amplifier to produce the linear power output. A sinusoidal power signal is applied at the terminal A which is connected to the variable resistor 11. A signal of the desired amplitude is picked off this resistor 11 by the wiper 13 and applied to the junction point 15. The capacitors 27 and 31, the inductor 29, and the primary 33 of the transformer 35 combine to produce a bandpass filter which in this case allows the passage of only the fundamental frequency, 400 cycles per second. This filter is only necessary when the power supply to the transformer 24 in FIGURE 2 is of a poor wave shape. If the power applied to terminal A is of a good sinusoidal wave shape, the filter elements 27, 29, and 31 are not required. The diodes 63 and 65 along with the center tap secondary winding 45 of the transformer 35 constitute a full wave rectifier and a full wave rectified unfiltered signal appears at the junction point 61. The combination of the resistor 59 and the Zener diode 55 constitute a voltage divider to hold the center tap 47 at some desired point above ground. The reason for keeping the center tap above ground is to produce a sharp point on the junction point between the rectified half cycles of the waveform appearing in junction point 61 by maintaining both diodes in conduction when the alternating waveform is near ground. The full wave rectified unfiltered signal is applied to the base 71 of the transistor 73. The transistor 73 provides current amplification only and since it is used as a common collector transistor, a low output impedance is presented at the junction point 79. The signal is fed into the emitter 91 at the transistor 93 and for this reason again gives a low input impedance to this transistor which is connected in the common base configuration. With a low output impedance in the stage using the transistor 73 and a low input impedance in the stage using the transistor 93, the capacitor 83 gives a differentiation of the full wave rectified sine wave signal to produce a signal as is shown at the junction point 85. The diode 105 effectively connects the base 101 of the transistor 93 to ground 17 in so far as the amplification of the transistor is concerned, and still provides a D.C. bias for the base 101 which is slightly above ground. The transistor 93 gives voltage amplification on its collector 95. The signal appearing at the junction point 97 is applied to the base 107 of the transistor 109. Since the transistor 109 is connected in a common collector configuration, the output signal has a current gain only and the signal with the amplified current is applied to the primary winding 115 of the transformer 117. The transformers 35, 117, and 169 are what is known as "DOT" transformers which are miniaturized transformers that cannot stand much unbalance of D.C. current. For this reason some precautions must be taken to keep the D.C. current balanced or at low levels. The signal applied to the primary 115 of the transformer 117 is divided into two signals by the two halves of the secondary winding 131, which has leads 133 and 147 which are 180 degrees out of phase. The current through the transistor 109 flows through the primary 115 of transformer 117 and through the resistor 125 to ground through the diode 105. This current flow keeps the junction point 123 at a predetermined voltage. The fact that the junction point 123 is kept at a certain voltage, also means the center tap 129 of the secondary winding 131 on transformer 117 is kept at the same voltage. This voltage is used to supply a bias current to the transistors 139 and 153. The resistors 161 and 171 which are the largest resistance elements in the path from the center tap 129 to the ground point 17 through the transistors 153 and 139 are matched to 1% and thus balance out the current in the windings 131 and 167. The capacitors 175 and 165 pass the A.C. signal which is applied to the bases 137 and 151 of the transistors 139 and 153 respectively by the secondary 131 of the transformer 117. This signal is applied to the primary 167 of the transformer 169 and appears as an output signal on terminals B and C from the secondary windings 179 and 181. The amplitude of this signal is adjusted by varying the wiper 13 on the variable resistor 11. Another voltage is picked off from the resistance element 21 of potentiometer 20 by the wiper 25 thereof and applied to the primary winding 185 of the transformer 187. The center tapped secondary winding 191 and the diode bridge 193 constitute a full wave rectifying system. The output of this full wave rectifier is applied to junction points 213 and 207 to be filtered by the combination of the capacitors 225 and 219 and the resistors 229 and 235. This filter combination produces a very smooth positive and negative direct voltage which is applied to leads 237 and 243 of secondary windings 181 and 179 respectively. These voltages provide a clamping action to produce a waveform on the terminal B which has as ground the point which connects the trailing edge of one waveform with the leading edge of the following waveform. The same is true of the alternating waveform appearing at terminal C. Since matched resistors are used for the resistance elements 229 and 235 the two signals are clamped at very nearly the same D.C. level. The point at which the alternating signals are clamped is determined by the point at which the wiper 25 on the resistance element 21 is positioned. The five transistors shown in this figure are all NPN transistors and all operate in the class A condition. The polarity of the applied voltages is therefore such as to accommodate the NPN type transistors. However, it can easily be seen that PNP transistors could be used if desired with a juggling of the polarity of the applied voltages. In this amplifier both positive and negative voltages are used with respect to ground. For the purposes of the invention, this particular configuration is not required since the points which are shown at ground potential could be raised above ground with the positive potential raised even further above ground and the points shown as negative terminal could be connected to ground. The purpose of the circuit in FIGURE 1 is to produce the nonlinear output waveform represented by FIGURE 3*a*, which could be produced by circuits of varying designs of which this is only one embodiment.

In FIGURE 2 the left hand portion generally constitutes the computing portion of the circuit which matches the nonlinear waveform with the input control voltage to produce an output triggering pulse and the right hand section generally constitutes the control rectifier portion along with the load and the sinusoidal power supply. A portion of the computing circuit is the blocking oscillator or multiar. One multiar includes the windings 346 and 348, the capacitors 398 and 368, and the transistor 338. The comparable components on the bottom of FIGURE 2 constitute a second blocking oscillator or multiar. The signals which are obtained from the function generator in FIGURE 1 are shown on the leads connected to the terminals B and C.

For the purposes of explanation, it may arbitrarily be assumed that the signal applied to terminal 300 is positive with respect to the terminal 302 which is connected to ground. As can be seen both the terminals 308 and 310 are at the same potential. As long as no current is flowing in the reverse direction through the transistor 338 or through the capacitor 340 to ground, the emitter 336 on transistor 338 is also at the same potential as the junction point 308. Since the terminal B is always held at a potential negative with respect to ground by the clamping circuit from FIGURE 1 and the alternating waveform, the current will flow from junction point 308 through the diode 312, primary winding 348, resistor 464 and to ground through the function generator. A drop of approximately 0.6 of a volt across the diode 312 will place the base 342 of the transistor 338 at a lower potential than the emitter 336. Since conduction from the emitter to the base of an NPN transistor is very slight, there will be no turn-on point on this transistor as long as there is a positive potential applied to the input terminal 300. The positive potential applied to the input terminal 300 will not allow current flow through the diode 316 as long as the base 320 of the transistor 322 is at a lower potential than the input control voltage. When the amplifier and the function generator are adjusted properly, the input voltage will never be greater than the peak voltage supplied from the function generator in FIGURE 1. It may thus be assumed that the nonlinear waveform initially is of a greater potential than the control voltage $E_{in}$. While this nonlinear voltage is of greater potential, current flow will be allowed from the terminal C through the resistor 392, winding 356, diode 316, diode 312, winding 348, resistor 364, and back to the terminal B of the function generator. As long as the waveform applied to the power amplifier from the terminal C is more positive than the voltage $E_{in}$, the PNP transistor 322 cannot switch to an "on" condition since the base 320 is positive with respect to the emitter 324 from the voltage drop in the diode 316. At the instant the voltage on the waveform and the input voltage are at equal potentials, current flow will stop through the diode 316. Immediately thereafter, the voltage $E_{in}$ is of a higher potential than the voltage applied to the terminal 318 and current flow is produced from terminal 300 through the resistor 328 and back to the terminal C through the emitter 324 of the transistor 322. Until this time, the capacitor 418 has been charged to the potential of the negative power supply which in one embodiment of the invention is −28 volts. The current flow through the transistor starts increasing very rapidly because of the low resistance source of −28 volts which appears at the junction point 416 due to the charged capacitor 418. The transformer action of the current flowing through the winding 358 produces a negative going pulse on the lead 402 of the transformer winding 356. The regenerative action drives the base 320 even more negative and turns the transistor 322 on to a greater extent so that in a very short period of time the transistor 322 is operating at full conduction. In one embodiment of the invention the term "very short period of time" is approximately one to two microseconds. When the transistor 322 reaches full conduction, there is no more change in current flow through the transformer winding 358 and at this time the capacitor 418 is completely discharged. The bias current then becomes less than that required to sustain full conduction in the transistor and the amount of current flow from emiter to collector is accordingly reduced. This action is again regenerative through the transformer action from the winding 358 to the winding 356 and at this time the lead 402 produces a positive going voltage with respect to the emitter 324 to help turn the transistor 322 off at an even faster rate. The action of the transistor turning "on" and "off" in a short period of time produces pulses on leads 522 and 504 of the secondary windings 362 and 360 respectively. In the embodiment mentioned before, the total pulse width which appeared on the leads 504 and 522 was approximately 5 to 10 microseconds. Since the control rectifiers 508 and 490 are connected to a center tap transformer which supplies the power for this amplifier, it can be seen that the anode of one of the rectifiers 490 or 508 will always have a voltage which is positive with respect to ground. This type of rectifier however will not turn on merely because the anode is positive with respect to the cathode. As soon as a pulse is applied to one of the control leads 496 or 514 of the rectifiers 490 and 508 respectively the rectifier which has a positive voltage to the anode will conduct and the other rectifier which has a negative voltage applied to the anode will remain nonconducting. It may arbitrarily be assumed that, at the instant of the first pulse, the lead 442 of the transformer 424 is in a positive polarity with respect to ground and this would cause conduction through the diode or rectifier 508 to the junction points 478, 476, 474, 472, and 468. This current would flow through the load 460 to ground. On the next half cycle the control rectifier 490 would have a positive potential applied to the anode 492 and current flow would be through the rectifier 490 through the junction points 482, 476, 474, 472, and 468. Again current flow would be from the point 468 in the load 460 to ground 304. Since the multiar of which the transistor 338 is a part did not conduct at any of these times there will be no triggering of the pulse applied to the rectifiers 524 and 542 and thus no conduction would take place at either of these rectifiers.

If the voltage $E_{in}$ were of a negative polarity, the transistor 338 would turn on and off each half cycle to produce pulses on the leads 556 and 538 of the windings 352 and 350 respectively. In this case the transistor 322 would not turn "on." When the transistor 338 produces the pulses which trigger the control rectifiers 524 and 542, the current flow will be in the opposite direction from what it was stated before. In this case the current flow would be from ground through the load 460, the terminal 468, the terminal 472, the anode 544 of the rectifier 542, and from there to one side 442 of the secondary winding 432 on one half cycle. On the next half cycle the current would go through the load 460 and the rectifier 524 to the other lead 450 of the secondary winding 534. It can thus be seen that when the positive input voltage is applied, the voltage applied to the load 460 will be positive and of a total power which in magnitude is indicative in a linear function of the magnitude of the voltage $E_{in}$. When the input voltage is negative, the voltage applied to the load 460 reverses and becomes negative.

The reason for using the resistors 364 and 392 in this particular embodiment, is to prevent loading of the function generator. If the function generator were stable enough, these resistors would not be needed. The resistors 328 and 332 are used in this embodiment, to isolate the emitters of the transistors 322 and 338. The diodes 380 and 410 are to prevent inductive kick-back from the winding which could damage the transistors and also to damp out any reverse voltages which might tend to continue the oscillation of the transistors. The values given to the resistors 420 and 388 and the capacitors 418 and 398 are such as to permit fast charging of the capacitors 418 and 398 relative to the half-cycle period of the power supply frequency. The load 460 should be essentially resistive for best performance and efficiency and the purpose of the resistor 462 and the capacitor 464 is to tune the motor 466 to produce an essentially resistive load.

In one successful embodiment of the invention the following values were found satisfactory:

| | |
|---|---|
| Resistors 328, 332, 462 | 100 ohms. |
| Resistor 19 | 270 ohms. |
| Resistor 11 | 500 ohms. |
| Resistors 21, 23, 81, 500, 518, 534, 552 | 1000 ohms. |
| Resistors 161, 171 | 2400 ohms. |
| Resistors 229, 235 | 2700 ohms. |
| Resistor 59 | 4300 ohms. |
| Resistors 69, 99 | 10,000 ohms. |
| Resistors 125, 138 | 12,000 ohms. |
| Resistor 89 | 22,000 ohms. |
| Resistors 364, 392 | 24,000 ohms. |
| Resistors 388, 420 | 39,000 ohms. |
| Capacitors 249, 253 | .001 μfd. |
| Capacitors 368, 396 | .002 μfd. |
| Capacitors 398, 418 | .005 μfd. |
| Capacitors 330, 340 | .015 μfd. |
| Capacitor 83 | .047 μfd. |
| Capacitors 502, 520, 536, 554 | .10 μfd. |
| Capacitor 31 | .15 μfd. |
| Capacitor 27 | .22 μfd. |
| Capacitors 486, 488 | .25 μfd. |
| Capacitor 127 | 1.0 μfd. |
| Capacitor 464 | 2.0 μfd. |
| Capacitors 165, 175 | 6.8 μfd. |
| Capacitors 219, 225 | 22.0 μfd. |
| Transistors 73, 93, 109, 139, 153 | 2N697. |
| Transistor 338 | 2N699. |
| Transistor 322 | 2N1132. |
| Diodes 312, 316, 380, 410 | IN457. |
| Diodes 63, 65, 205, 209, 211, 215 | IN645. |
| Diode 55 | IN706. |
| Diode 105 | SG22. |
| Transformer 169 | DO–T37 (U.T.C.). |
| Transformer 117 | DO–T36 (U.T.C.). |
| Transformers 35, 187 | DI–T36 (U.T.C.). |
| Transformers 344, 354 | 18970 (Sprague). |
| Transformer 424 | 33033 (Mpls. Hon.). |
| Inductor 29 | ML–7 (U.T.C.). |
| Direct current power voltage | ±28 volts. |
| A.C. power voltage | 115 volts 400 c.p.s. |

While I have shown and described one embodiment of this amplifier, further modifications and improvements will occur to those skilled in the art. I desire to be understood, therefore, that this invention is not limited to the particular form shown and described and I intend in the appended claims to cover all modifications which do not depart from the spirit and scope of this invention.

What I claim is:

1. In an amplifier circuit: means for supplying a signal representative of that obtained when a sine wave is full wave rectified and differentiated; computing means connected to receive said differentiated signal from said signal supplying means and adapted to receive an input control signal voltage, said computing means being adapted to provide an output signal in the form of a triggering pulse whenever said control signal voltage and an output voltage from said signal supplying means are of predetermined values; means for supplying a generally sinusoidal power signal; and controlled rectifying means connected to receive said output signal of said triggering computing means and to receive said power signal and adapted to switch to an "on" condition whenever power of a predetermined polarity and a triggering pulse of a predetermined polarity are applied.

2. In a linear power amplifier characterized by producing output signals which vary linearly with input control signals applied thereto when the applied power is generally of a sinusoidal wave shape: means for supplying a signal representative of that obtained when a sine wave is full wave rectified and differentiated; computing means including input and output means, connected to receive said differentiated signal from said signal supplying means at said input means and adapted to receive an input control signal voltage, said computing means being adapted to provide an output signal at said output means in the form of a triggering pulse whenever said control signal voltage and the output signal voltage from said signal supplying means are of predetermined values; power supplying means; and rectifying means including input, output, and control means, said rectifying means connected for receiving said output signal of said computing means and connected for receiving a power signal from said supplying means and adapted to switch to an "on" condition whenever power of a predetermined polarity and a triggering pulse of a predetermined polarity are applied thereto.

3. In an amplifier circuit: means for supplying a signal representative of a sine wave which has been full wave rectified and differentiated; computing means connected to receive said differentiated signal and adapted to receive an input control signal voltage, said computing means being adapted to provide an output signal in the form of a triggering pulse whenever said control signal voltage and an output voltage from said signal supplying means are of predetermined values; means for supplying a generally sinusoidal power signal; rectifying means connected to receive said output signal of said computing means and to receive said power signal and adapted to switch to an "on" condition whenever power of a predetermined polarity and a triggering pulse of a predetermined polarity are applied; and load means connected to receive said output signal from said rectifying means.

4. In an amplifier circuit: signal generating means including output means, adapted to provide an output signal at said output means which is representative of a sine wave which has been full wave rectified and differentiated; computing means including input and output means, said input means being connected to said output means of said signal generating means and adapted to receive an input control signal voltage, said computing means being adapted to provide an output signal at said output means in the form of a triggering pulse whenever said control signal voltage and said output voltage from said signal generating means are equal in amplitude; and solid-state controlled rectifier means connected to receive said output signal of said computing means and adapted to switch to an "on" condition whenever power of the proper polarity and a triggering pulse of the proper polarity are applied.

5. In an electronic device: means for providing a sinusoidal power signal; bandpass filter means including input and output means, adapted to pass only the fundamental frequency of said sinusoidal waveform and connected to receive said sinusoidal signal at said input means; rectifying means including input and output means, said input means being connected to said output means of said filter means and adapted to provide an unfiltered, rectified output signal; differentiating means including input and output means, said input means being connected to said output means of said rectifying means and adapted to provide at said output means of said differentiating means, the differentiated product of said rectified output signal from said rectifying means; clamping circuit means including input and output means, said input means being connected to receive said input power signal and adapted to provide a variable level D.C. output signal; amplifying means including input and output means, said input means being connected to receive said differentiated signal from said output means of said differentiating means and to receive said output means of said D.C. level signal from said clamping means and adapted to provide an alternating output signal with a D.C. component dependent in polarity and magnitude with respect to a reference level, upon the polarity and magnitude of said D.C. signal from said clamping means; blocking oscillator means including input and output means, said input means being adapted to receive an input control signal and connected to receive said output signal from said output means of said amplifying means as a second input signal and adapted to provide a triggering output pulse upon predetermined conditions of signals applied to said input means; and thyratron-type means including input and output means, said input means being connected to receive said sinusoidal power signal and to receive said output pulse from said output means of said blocking oscillator means and adapted to provide an output signal which is directly proportional in power to said control signal amplitude, due to the nonlinearity of said differentiated signal.

6. In an amplifying device: means for supplying first and second function signals representative of a sine wave which has been full wave rectified and differentiated; first blocking oscillator means connected to receive said first function signal, adapted to receive a control signal, and also adapted to provide an output triggering pulse when said control and said function signals reach predetermined values; second blocking oscillator means connected to receive said second function signal, adapted to receive said control signal, and also adapted to provide an output triggering pulse when said control and said function signals reach predetermined values; means for supplying first and second, generally sinusoidal, power signals; first solid state controlled rectifier means connected to receive output signals from one of said blocking oscillator means and to receive one of said power signals and adapted to switch to an "on" condition whenever power of the proper polarity and a triggering pulse of the proper polarity are applied; second solid state controlled rectifier means connected to receive output signals from the other of said blocking oscillator means and to receive one of said power signals and adapted to switch to an "on" condition whenever power of the proper polarity and a triggering pulse of the proper polarity are applied; and load means connected to receive power of a first polarity from said first rectifier means and of a second polarity from said second rectifier means.

7. In an electronic device: means for providing a first sinusoidal power signal; bandpass filter means including input and output means, adapted to pass only the fundamental frequency of said first sinusoidal waveform and connected to receive said first sinusoidal signal at said input means; rectifying means including input and output means, said input means being connected to said output means of said filter means and adapted to provide an unfiltered, rectified output signal; differentiating means including input and output means, said input means being connected to said output means of said rectifying means and adapted to provide at said output means of said differentiating means, the differentiated product of said rectified output signal from said rectifying means; clamping circuit means including input and output means, said input means being connected to receive said first input power signal and adapted to provide variable levels for two D.C. output signals; amplifying means including input and output means, said input means being connected to receive said differentiated signal from said differentiating means and to receive said two D.C. level signals from said clamping means and adapted to provide two alternating output function signals with D.C. components dependent in polarity and magnitude with respect to a reference level, upon the polarity and magnitude of said D.C. signals from said clamping means; means for providing a control signal; first blocking oscillator means including input and output means, said input means being connected to said output means of said amplifying means to receive one of said two function signals, connected to receive said control signal, and adapted to provide an output triggering pulse when said control and said function signals reach predetermined values; second blocking oscillator means including input and output means, said input means being connected to said output means of said amplifying means to receive the other of said function signals, connected to receive said control signal, and adapted to provide an output triggering pulse when said control and said function signals reach predetermined values; means for supplying second and third, generally sinusoidal, power signals; first controlled rectifier means including input, output, and control means, said control means being connected to receive output signals from one of said blocking oscillator means and said input means being connected to receive said second power signals and said rectifier means being adapted to switch to an "on" condition whenever power of the proper polarity and a triggering pulse of the proper polarity are applied; second controlled rectifier means including input, output, and control means, said control means being connected to receive output signals from the other of said blocking oscillator means and said input means being connected to receive third power signals and said rectifier means being adapted to switch to an "on" condition whenever power of the proper polarity and a triggering pulse of the proper polarity are applied; and load means connected to receive power of a first polarity from said output means of said first rectifier means and of a second polarity from said output means of said second rectifier means.

8. In an amplifying circuit: computing means including input and output means; bias means connected to said input means of said computing means for supplying a signal thereto which is representative of that obtained when a sine wave is full wave rectified and differentiated;

means connected to said input means of said computing means for supplying an input control signal thereto, said computing means being adapted to provide an output signal at said output means in the form of a triggering pulse whenever said control signal voltage and said signal from said bias means are of a predetermined relationship; means for supplying a generally sinusoidal power signal; and controlled switching means connected to receive said power signal and connected to said output means of said computing means to receive the triggering pulse therefrom, said controlled switching means having first and second conditions and being adapted to switch from said first condition to said second condition whenever the power signal and the triggering pulse are applied in a predetermined relationship.

9. A function generator comprising, in combination: full wave rectifying means including input and output means; means for supplying sine wave power, connected to said input means of said rectifying means to supply power thereto; differentiating means including input and output means, said differentiating means being adapted for providing a nonlinear output signal at said output means which is indicative of the time rate of change of any signal applied to said input means of said differentiating means; means connecting said output means of said rectifying means to said input means of said differentiating means; switching means including input means and output means; input signal supplying means; and means connecting said switching means for receiving signals from said output means of said differentiating means and from said input signal supplying means, said switching means being adapted for providing an output signal having a substantially linear variation in power with a linear variation in voltage of an input signal applied to said input signal supplying means, said linear variation in power being obtained by switching when the input signal bears a predetermined amplitude relationship to the amplitude of said nonlinear output signal obtained from said differentiating means.

References Cited by the Examiner

UNITED STATES PATENTS

| | | | |
|---|---|---|---|
| 2,920,240 | 1/60 | Macklem | 307—88.5 |
| 2,925,546 | 2/60 | Berman | 321—8 |
| 2,953,735 | 9/60 | Schmidt | 321—5 |
| 2,959,691 | 11/60 | Zoerner et al. | 307—88.5 |
| 2,977,523 | 3/61 | Cockrell | 307—88.5 |
| 3,067,343 | 12/62 | Roscoe | 307—88.5 |
| 3,074,008 | 1/63 | McPhail et al. | 307—88.5 |
| 3,102,223 | 8/63 | Burnett | 321—41 |

OTHER REFERENCES

Solid State Products, Inc., Applications and Circuit Design Notes, Bulletin, D420–02, September 1960, pages 22–26.

LLOYD McCOLLUM, *Primary Examiner.*

SAMUEL BERNSTEIN, *Examiner.*